Patented Dec. 18, 1928.

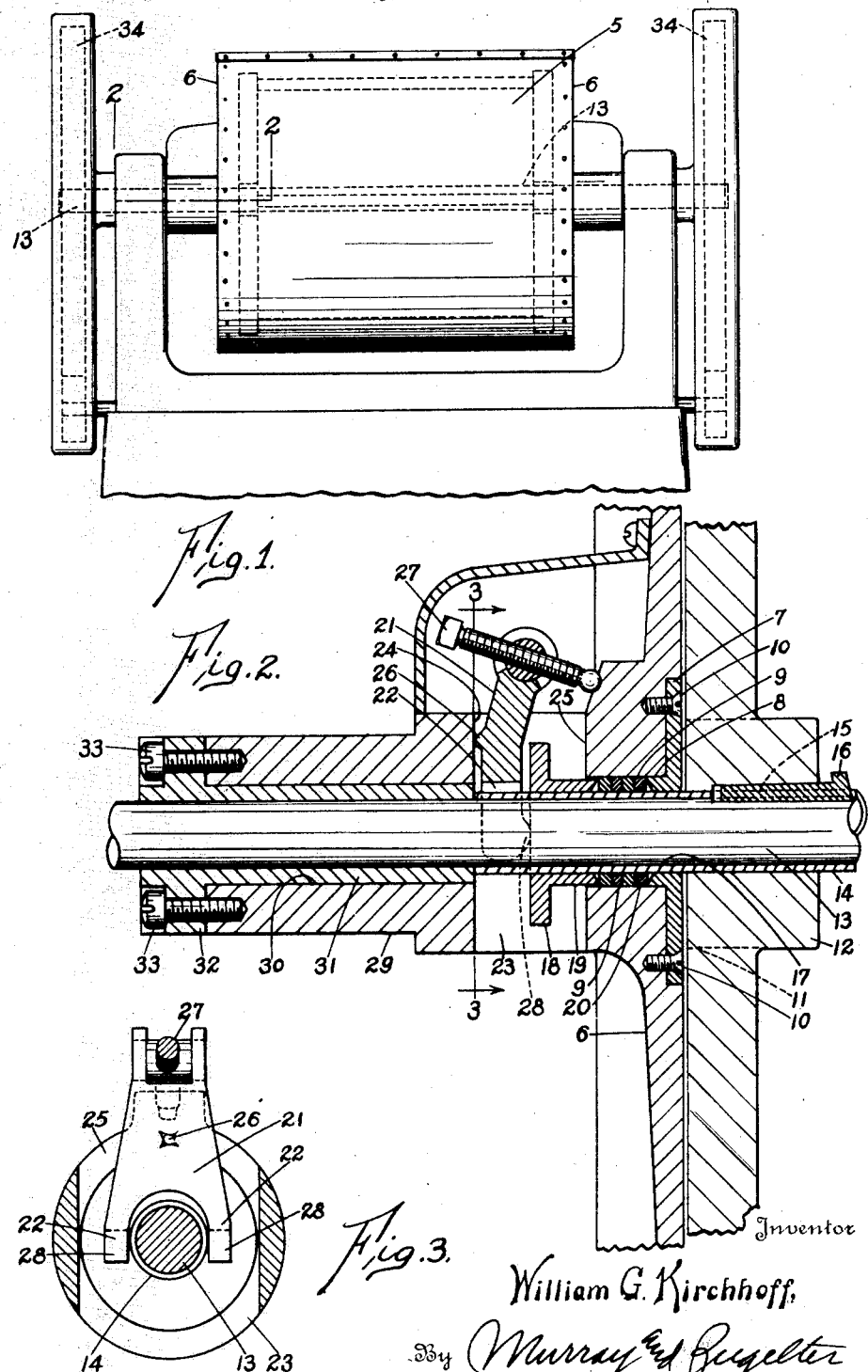

1,696,094

UNITED STATES PATENT OFFICE.

WILLIAM G. KIRCHHOFF, OF CINCINNATI, OHIO, ASSIGNOR TO THE J. H. DAY COMPANY, OF CINCINNATI, OHIO, A CORPORATION OF OHIO.

STUFFING BOX AND BEARING STRUCTURE.

Application filed April 30, 1926. Serial No. 105,827.

This invention relates to a stuffing box and particularly for such structures when applied to mixing tanks and the like wherein the substance to be mixed has a derogatory effect upon the shaft and parts of the mixing tank exposed thereto.

An object of my invention is to provide a stuffing box and agitator shaft structure which is comparatively inexpensive of manufacture and which will not be subject to corrosion in its inaccessible parts.

Another object is to provide a device of this kind which is simple of assembly and wherein replacement of parts is facile.

These and other objects are attained by the means described herein and disclosed in the accompanying drawings:

Fig. 1 is a fragmental elevational view of a mixing tank structure having embodied therein devices of my invention.

Fig. 2 is a cross sectional view taken on line 2—2 of Fig. 1.

Fig. 3 is a cross sectional view taken on line 3—3 of Fig. 2.

In constructing mixing tanks having agitators and agitator shafts, there has long been experienced a difficulty in effecting a thorough cleaning of all the surfaces of the tank, agitator and agitator shaft, which may be exposed to the action of such liquids as may be contained in the substance to be mixed. For example in dough mixing, the salt in solution contained in the dough will cause rapid corrosion and destruction of such surface of the exposed parts as are not cleaned. Such parts as were so close together as to preclude cleaning the proximate surfaces were made of bronze in order to overcome the effect of the brine.

In dough mixers however both agitator hub and the adjacent parts of the tank, were made of bronze but the brine would find its way between the parts and run onto the shaft which would be inaccessible without dismantling the mixer. The ordinary steel shaft would therefore soon become corroded and useless.

In the present invention as applied to a dough mixer, for example the mixing tank 5 would have cast iron end walls 6, having bronze plates 7 seated about the bore through which the agitator shaft extends. The plates 7 carry integral annular flanges 8 against which the usual packing rings 9 may abut. The plate 7 is screwed to the inner wall of the tank by means of screws 10 so that the surface of the tank and the surface of the plate are flush with one another. The plate 7 is slightly larger in diameter than the adjacent end 11 of the agitator hub 12 so that the adjacent parts which are not accessible for cleaning will be of bronze.

In order to be able to use the ordinary steel shaft for the agitator, the agitator shaft 13 is provided with a bronze sleeve 14 having an elongated perforation 15 in the wall thereof to permit passage of a key 16 therethrough, so that the key will lock the agitator, sleeve and shaft together for rotation as a unit. The sleeve extends through the bore 17 in the plate 7 and receives the packing rings 9 and gland 18 of the stuffing box, so that the end of the sleeve terminates exteriorly of the tank and stuffing box.

This structure is carried out at each side of the tank in the same manner so that a description of one will suffice for both.

As will be noted in Fig. 2, the flange 8 of the plate 7 and the flange 19 of the gland 18, enter the bore 20 in the tank wall 6 from opposite ends, and have the packing washers 9 disposed between them. Any suitable structure may be employed for effecting movement of the gland 18 into the bore 20 for compressing and spreading the packing washers.

As shown in Figs. 2 and 3, a yoke member 21 provided with arms 22 which are disposed on opposite sides of the sleeve 14, may be employed for this purpose. The arms 22 extend downwardly into an opening 23 formed in the end wall structure of the tank. The opening 23 has opposed side walls 24 and 25 and a projection 26 on the yoke 21 abuts the wall 24 and serves as a fulcrum about which the yoke may be moved by means of an adjustment screw 27 extending through the top portions of the yoke.

The ends 28 of arms 22 will force the gland 18 into the bore 20 as the adjustment screw 27 is tightened. The boss 29 projecting beyond the opening 23 has a bore 30 in alignment with bore 20 in the end wall and receives the bearing bushing 31 in which the shaft 13 is journaled. The bearing 31 is provided with a shouldered portion 32 which abuts the end of the boss 29 and is screwed thereto by means of screws 33. And the driving gears 34 may be keyed to that portion of the shaft 13 extending beyond the bearing bushing 31.

From the foregoing it will be apparent that all of the inaccessible portions of the shaft, agitator and tank walls, will present bronze surfaces to the liquids, and that leakage is precluded by means of the stuffing box.

It should be noted that the structure just described entails comparatively small cost above the usual structure employing the ordinary steel shaft, and that it eliminates the necessity for frequent renewal of agitator shafts.

The advantages of the present invention have been attained in other ways. One method employed heretofore consists in casting a heavy bronze sleeve adjacent each end of a steel shaft such as 13 and then turning down the sleeve and shaft to the required size. This method however is costly both as to material and labor. It is also known that a non-corroding metal known as Monel metal is available for the purpose, but the cost thereof is so excessive as to render prohibitive the use thereof in mixing machinery and the like. The present structure, it will be noted affords a material saving in time, labor and cost of materials and at the same time attains the maximum advantages of costlier structures.

What I claim is:

1. In a stuffing box structure, the combination with a tank wall having a bore therethrough of a perforated plate of non-corroding metal having an annular flange extending into the bore in the tank wall, a steel shaft journaled exteriorly of the tank wall and extending through the bore therein, a sleeve of non-corroding metal carried by the shaft and terminating at its journaled bearing, a non-corroding hub on the sleeve adjacent the plate, means for securing the hub, sleeve and shaft against relative rotation and stuffing means comprising packing material and a gland, surrounding the sleeve in the bore in the wall for compressing the packing material against the annular flange 2. In a mixing tank structure, the combination of a tank wall having a bore therethrough, a steel shaft extending through the bore and journaled spacedly of the exterior face of the tank wall, a sleeve of non-corroding material surrounding the shaft and terminating exteriorly of the tank wall, a hub of non-corroding metal on the sleeve, means to lock hub, sleeve and shaft against relative movement, a fixed noncorroding metal plate surrounding the sleeve and serving as an abutment for the hub, packing members surrounding the sleeve within the bore in the tank wall and a stuffing gland for pressing the packing members against the plate.

3. In a device of the class described the combination with a cast iron tank wall having a bore therethrough and a recess surrounding the bore on one side of said wall of a bronze plate secured in the recess and having a bore therethrough and an annular flange surrounding said bore and extending into the bore in the tank wall, a bronze sleeve passing through the bore in the plate and flange and extending beyond the tank wall, a steel shaft in the sleeve and having a bearing adjacent the end of said sleeve, a bronze hub on the sleeve, a key extending through the sleeve and into the hub and shaft and a packing element surrounding the sleeve within the bore in the tank wall.

In testimony whereof, I have hereunto subscribed my name this 26th day of April, 1926.

WILLIAM G. KIRCHHOFF.